May 1, 1951  V. E. NEEDHAM  2,551,503

STEERING HEADS OF CYCLES

Filed Oct. 11, 1948

Inventor
Victor Ernest Needham
By
Harris & Patterson
Attorneys.

Patented May 1, 1951

2,551,503

UNITED STATES PATENT OFFICE 2,551,503

STEERING HEADS OF CYCLES

Victor Ernest Needham, Wilford, England, assignor to The Birmingham Small Arms Company Limited, Small Heath, England, a British company Application October 11, 1948, Serial No. 53,949
In Great Britain October 17, 1947

5 Claims. (Cl. 280—279)

This invention relates to steering heads of cycles, and refers more particularly to the bearing of the steering head.

A cycle steering head as usually constructed is provided with upper and lower ball bearings which are adapted to support the fork stem, said bearings each comprising a cup member secured to the upper and lower ends of the steering head, while the cone member of the bearings is secured to the fork stem. The upper bearing is made adjustable, and such adjustment is effected by mounting the cone member on a screw threaded upper portion of the fork stem, said cone member being secured against rotation on the fork stem in its adjusted position by a lock nut.

The object of this invention is to provide an improved construction and arrangement of locking means for the adjustable cone member of the upper steering head bearing, which arrangement also allows a fine adjustment of the cone member to be readily and easily effected.

Locking means for a cycle steering head bearing in accordance with the present invention comprises in combination with a fixed bearing cup secured to the steering head and an adjustable cone member engaging with a threaded portion of the fork stem, a cover plate and lock washer slidably but non-rotatably mounted on the threaded portion of the fork stem, means for connecting said lock washer and cone member by a series of interengaging elements, and a lock nut on the threaded portion of the fork stem adapted to apply pressure to the cover plate whereby the adjustable cone member is secured against rotation relative to the fixed bearing cup.

Figure 1:
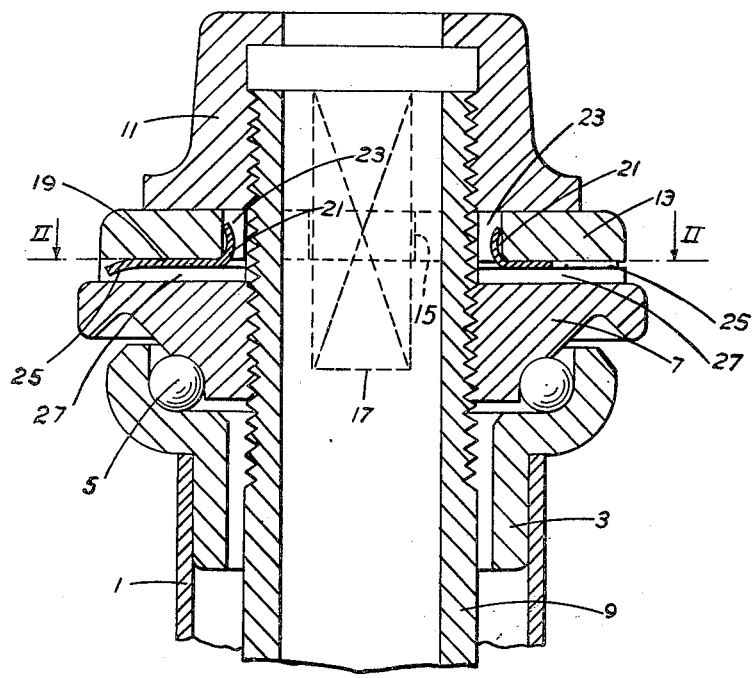
Figure 2:
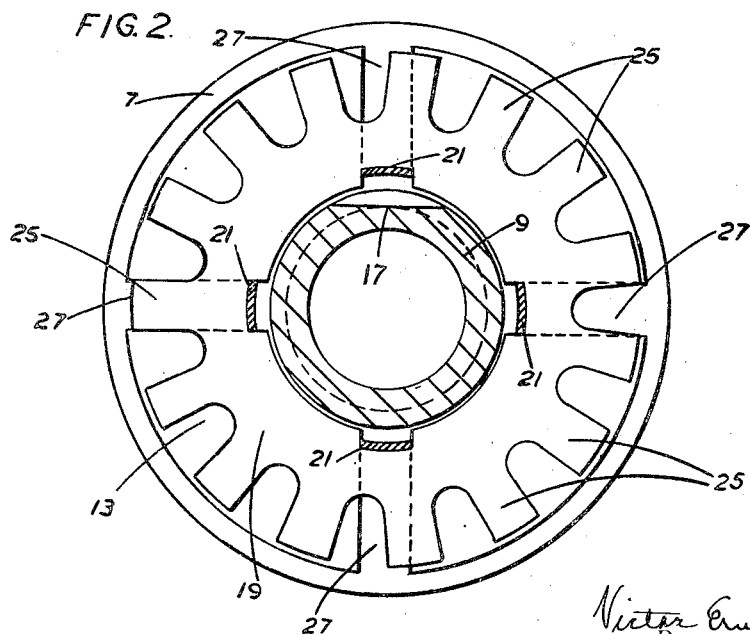

In the accompanying sheet of explanatory drawings, Figure 1 is a sectional side elevation and Figure 2 is a sectional plan view taken on line II—II, Figure 1, of the upper portion of a cycle steering head constructed in accordance with the invention.

In carrying the invention into effect as shown, the upper end of the steering head 1 of the cycle frame has fixed therein a bearing cup 3 constituting the fixed member of the upper steering head bearing. Located on said fixed member is a series of bearing balls 5 contacting with which is a bearing cone 7 constituting the adjustable member of the bearing, said cone being screw threaded internally to engage with the threaded upper end of the fork stem 9. A lock nut 11 is also provided with internal screw threads to engage with the threaded upper end of the fork stem 9, and interposed between the bearing cone 7 and said lock nut 11 is a cover washer or plate 13 which is slidable axially on the fork stem 9 but is restrained against rotation relative thereto by an internally projecting portion 15 on the cover plate 13 which is adapted to engage with a flat portion 17 on the outer threaded part of the fork stem 9, as indicated by dotted lines in Figure 1. Disposed between the cover plate 13 and the bearing cone 7 is a lock washer 19 comprising a spring steel disc freely mounted on the fork stem 9 but secured against rotation relative to the cover plate 13 by means of a series of upturned prongs or projections 21 engaging with a corresponding number of lateral slots 23 formed in the cover plate 13. As seen in Figure 2 the periphery of the lock washer 19 is cut away to form a number of equally spaced radially extending fingers or tongues 25, the ends of which are slightly inturned so that they project towards the adjacent surface of the bearing cone 7. In the outer face of the bearing cone 7 are formed a series of equally spaced radially extending shallow slots or channels 27 lying between the adjacent surfaces of said bearing cone and the cover plate 13. In the illustrative drawing four of these slots are shown, one of which is engaged by one of the fifteen fingers or tongues 25 on the lock washer 19, whereby the lock washer is fixed in the required adjusted position relative to the bearing cup 3.

The engagement of a finger or tongue 25 on the spring lock washer 19 with a slot 27 in the bearing cone 7 is effected automatically by pressure imparted to the cover plate 13 by screwing down the lock nut 11 whereby the end of a tongue in alignment with a slot 27 is forced down into the slot, the remaining tongues being compressed between the cover plate and the surface of the bearing cone.

When it is desired to adjust the bearing, it is only necessary to slacken off the lock nut 11 in order to free the pressure on the cover washer or plate 13. This permits the compressed tongues 25 on the spring lock washer 19 to lift the cover plate 13 sufficient to allow the finger retained by a slot 27 in the bearing cone 7 to disengage itself from the slot, whereby the bearing cone 7 is free to be turned on the threaded fork stem 9 to effect a correct relationship of the bearing cone 7 with respect to the fixed bearing cup 3 so as to constitute a properly adjusted bearing. By reason of the large odd number of tongues 25 compared with the relatively small even number of slots 27, one of the tongues will be in alignment with one of the slots even when only a very slight turning movement is given to the bearing cone 7, so that while holding said bearing cone in the adjusted position it is only necessary to tighten the lock nut 11 to cause the bearing cone to be locked in the manner already described by the engagement of a tongue 25 with a slot 27.

It will be appreciated that a uniform number of tongues and slots may be employed, and that within the scope of the invention the said interengaging tongues and slots on the respective lock washer 19 and bearing cone 7 may be transposed, i. e. resilient tongues formed on or fitted to the bearing cone may be adapted to engage with slots or depressions formed in the lock washer.

Having thus described my invention, what I claim as new and desire to secure by Letters Patent is:

1. Locking means for a cycle steering head bearing having a fixed bearing cup secured to the steering head, and an adjustable cone member engaging with a threaded portion of the fork stem, comprising the combination of a cover plate and lock washer slidably but non-rotatably mounted on the threaded portion of the fork stem, means for connecting said lock washer and cone member by a series of interengaging elements, and a lock nut on the threaded portion of the fork stem for applying pressure to the cover plate.

2. Locking means for a cycle steering head bearing having a fixed bearing cup secured to the steering head, and an adjustable cone member engaging with a threaded portion of the fork stem, comprising the combination of a cover plate slidably but non-rotatably mounted on the threaded portion of the fork stem, a lock washer attached to the cover plate and secured against rotation relative thereto, means for connecting said lock washer and cone member by a series of interengaging elements, and a lock nut on the threaded portion of the fork stem for applying pressure to the cover plate.

3. Locking means for a cycle steering head bearing having a fixed bearing cup secured to the steering head, and an adjustable cone member engaging with a threaded portion of the fork stem, comprising the combination of a cover plate slidably but non-rotatably mounted on the threaded portion of the fork stem, a lock washer comprising a spring steel disc attached to the cover plate and secured against rotation relative thereto, means for connecting said lock washer and cone member by a series of interengaging elements comprising radial fingers on the washer and radial slots formed in the cone member, and a lock nut on the threaded portion of the fork stem for applying pressure to the cover plate.

4. Locking means for a cycle steering head bearing having a fixed bearing cup secured to the steering head, and an adjustable cone member engaging with a threaded portion of the fork stem, comprising the combination of a cover plate slidably but non-rotatably mounted on the threaded portion of the fork stem, a lock washer comprising a spring steel disc attached to the cover plate and secured against rotation relative thereto by means of a series of upturned prongs on said disc engaging with lateral slots formed in the cover plate, means for connecting said lock washer and cone member by a series of interengaging elements comprising radial fingers on the washer and radial slots formed in the cone member, and a lock nut on the threaded portion of the fork stem for applying pressure to the cover plate.

5. Locking means for a cycle steering head bearing having a fixed bearing cup secured to the steering head, and an adjustable cone member engaging with a threaded portion of the fork stem, comprising the combination of a cover plate slidably but non-rotatably mounted on the threaded portion of the fork stem, a lock washer comprising a spring steel disc attached to the cover plate and secured against rotation relative thereto by means of a series of upturned prongs on said disc engaging with lateral slots formed in the cover plate, means for connecting said lock washer and cone member by a series of elements comprising radial fingers on the washer and radial slots formed in the cone member, and a lock nut on the threaded portion of the fork stem for applying pressure to the cover plate.

VICTOR ERNEST NEEDHAM.

REFERENCES CITED

The following references are of record in the file of this patent:

UNITED STATES PATENTS

| Number | Name | Date |
| --- | --- | --- |
| 1,409,748 | Meiselbach | Mar. 14, 1922 |
| 1,850,348 | Harley | Mar. 22, 1932 |